Patented Oct. 7, 1924.

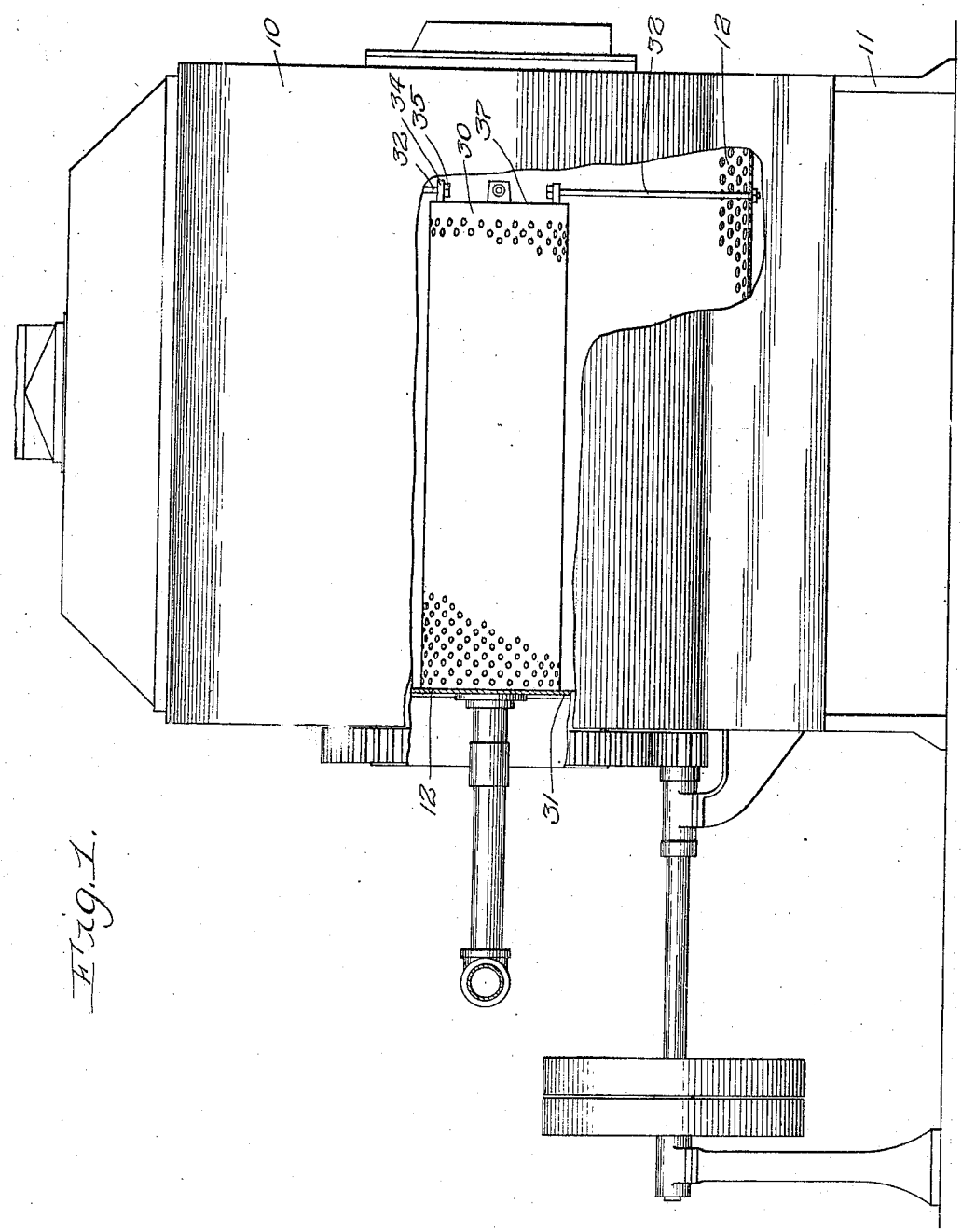

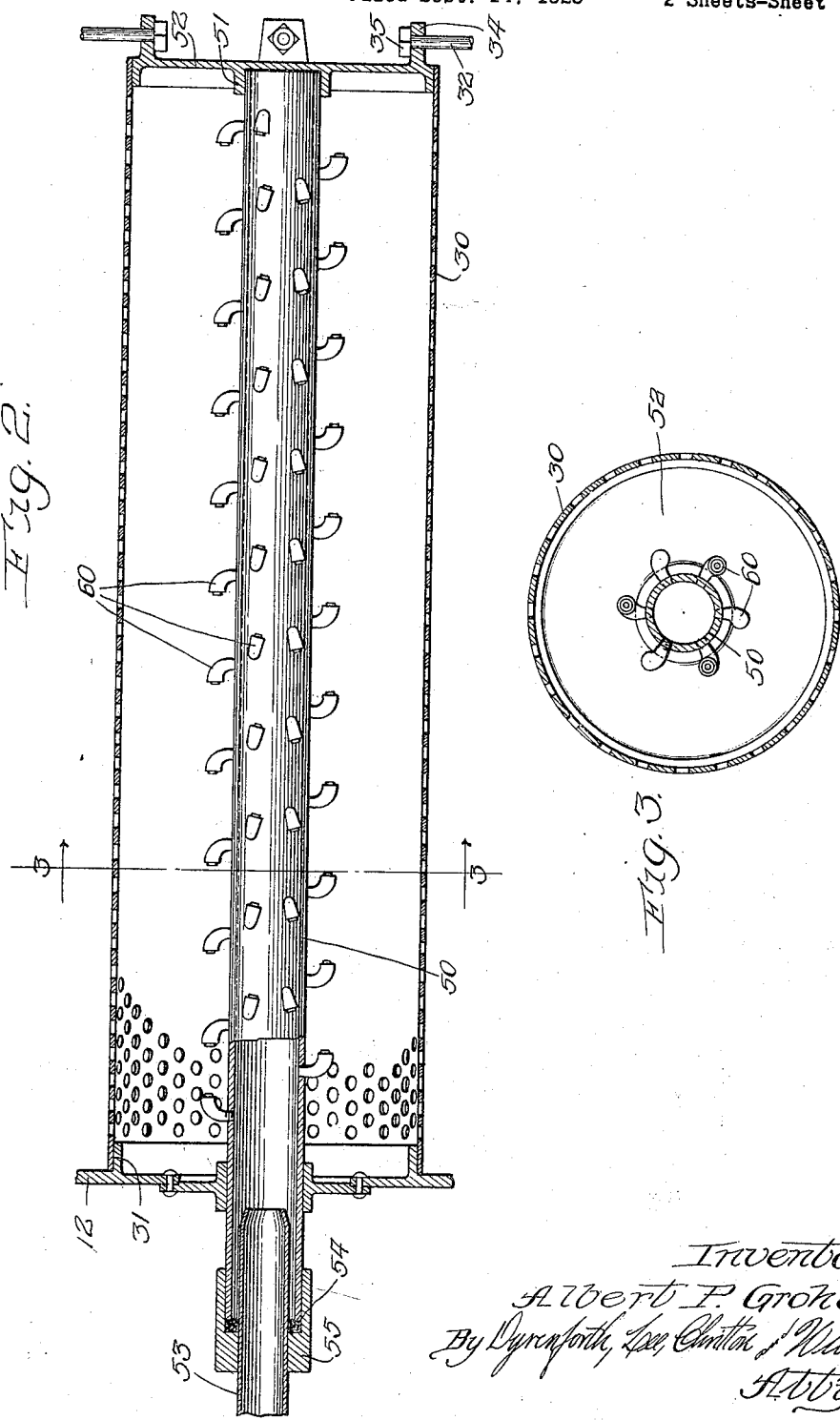

1,510,989

UNITED STATES PATENT OFFICE.

ALBERT P. GROHENS, OF MARSHALL, MICHIGAN, ASSIGNOR TO LAMBERT MACHINE COMPANY, OF MARSHALL, MICHIGAN, A CORPORATION OF MICHIGAN.

COFFEE ROASTER.

Application filed September 14, 1923. Serial No. 662,665.

*To all whom it may concern:*

Be it known that I, ALBERT P. GROHENS, a citizen of the United States, residing at Marshall, in the county of Calhoun and State of Michigan, have invented a new and useful Improvement in Coffee Roasters, of which the following is a specification.

This invention relates to improvements in coffee roasters and the like, and more especially to burners for the same. The invention is here shown as embodied in a coffee roaster of the same general type as that disclosed in my copending application, Serial No. 566,755, filed June 8, 1922.

Since the features of my invention relate more especially to the burner, and since the other details of the coffee roaster are the same as those of the roaster shown in my copending application above referred to, I will not describe, in this specification, the details of the coffee roaster itself, except as may be necessary for an understanding of the burner.

In that form of device embodying the features of my invention shown in the accompanying drawings, Figure 1 is a view in side elevation of a coffee roaster, showing a part broken away to disclose the burner inside, Fig. 2 is a vertical sectional view, on an enlarged scale, of the burner, and Fig. 3 is a view taken as indicated by the line 3 of Fig. 2.

The roaster comprises in general a substantially cylindrical casing 10 supported on legs 11. Axially arranged and rotatably mounted within the cylindrical casing 10 is a cylindrical perforated drum 12 adapted to contain the coffee being roasted. During the roasting operation the drum is rotated in any suitable manner.

Axially arranged within the drum is a smaller perforated cylinder or burner tube 30. The rear end of this cylinder or burner tube 30 is attached to the rear end wall of the drum 12 at 31. The forward end of the burner tube 30 does not extend to the forward end of the drum 12 and is supported by four radially arranged adjustable hanger rods 32. The outer ends of the hanger rods 32 are fastened to the curved wall of the drum 12, and their inner ends pass through lugs 34 mounted on the end 37 of the burner tube 30, and carry nuts 35. By adjusting the nuts 35 on the hanger rods 32, the position of the forward end of the burner tube 30 may be very accurately and finely adjusted, so that it will lie concentrically with the drum 12. It is obvious that the burner tube 30 is fixed with respect to the drum 12 and rotates with it. The curved wall of the burner tube 30 is perforated as indicated by 39.

Axially arranged with respect to the burner tube 30 is a burner pipe 50. The forward end of the burner pipe 50 is located within a ring 51 formed on the inner side of the end plate 52 of the burner tube 30. 53 indicates a pipe adapted to introduce gas, or other fuel into the burner pipe 50. The pipe 53 is stationary; and the burner pipe 50 rotates upon it. 54 indicates packing and 55 a packing nut arranged to prevent leakage of gas between the fuel pipe 53 and the rotating burner pipe 50.

The burner pipe 50 is provided with a plurality of elbows 60, as shown. It is apparent that these elbows will prevent flames from issuing radially from the burner pipe. They will direct the flames longitudinally or parallelly with the pipe. By means of this construction, the first intense heat is not thrown directly to the perforations in the burner tube 30, but the flames are directed parallelly with the burner pipe so that the heat is more dissipated and more even by the time it reaches the perforations in the tube 30. The heat is then also somewhat subdued by the burner tube 30 so that the heat passing through the perforations in this tube will not scorch the coffee beans in the drum 12.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent, is:

1. In a device of the character described, a rotatable drum adapted to contain the material to be roasted, a perforated burner tube axially arranged within the rotatable drum and adapted to rotate therewith, and heating means within the burner tube and adapted to rotate therewith.

2. In a device of the character described, a rotatable drum adapted to contain the material to be roasted, a perforated burner tube axially arranged within the rotatable drum and adapted to be rotated therewith, and heating means within the burner tube, said heating means comprising a burner pipe provided with longitudinally directed openings.

3. In a device of the character described, a rotatable drum adapted to contain the material to be roasted, a perforated burner tube axially arranged within the rotatable drum and adapted to be rotated therewith, and heating means within the burner tube, said heating means comprising a burner pipe provided with openings and having elbows attached thereto at said openings.

4. In a device of the character described, a rotatable drum adapted to contain the material to be roasted, a perforated burner tube axially arranged within the rotatable drum and adapted to be rotated therewith, and heating means within the burner tube and adapted to rotate therewith, said heating means comprising a burner pipe provided with longitudinally directed openings.

5. In a device of the character described, a rotatable drum adapted to contain the material to be roasted, a perforated burner tube axially arranged within the rotatable drum and adapted to be rotated therewith, and heating means within the burner tube and adapted to rotate therewith, said heating means comprising a burner pipe provided with openings and having elbows attached thereto at said openings.

6. In a device of the character described, a rotatable drum adapted to contain the material to be roasted, a perforated burner tube axially arranged within the rotatable drum, and heating means within the burner tube, said heating means comprising a burner pipe provided with longitudinally directed openings.

7. In a device of the character described, a rotatable drum adapted to contain the material to be roasted, a perforated burner tube axially arranged within the rotatable drum, and heating means within the burner tube, said heating means comprising a burner pipe having openings and having elbows attached thereto at said openings.

In witness whereof, I have hereunto set my hand and seal this 15th day of August, 1923.

ALBERT P. GROHENS. [L. S.]